United States Patent [19]
Smith

[11] Patent Number: 5,568,372
[45] Date of Patent: Oct. 22, 1996

[54] CIRCUIT FOR DETECTING NEGATIVE OUTPUT RAILS

[75] Inventor: David A. Smith, Kowloon, Hong Kong

[73] Assignee: Astec International, Ltd., Hong Kong, Hong Kong

[21] Appl. No.: 90,406

[22] Filed: Jul. 12, 1993

[51] Int. Cl.$^6$ ................................................ H02M 3/335
[52] U.S. Cl. .................... 363/74; 363/75; 363/49; 323/361
[58] Field of Search .................... 363/49, 74, 75, 363/21; 323/250, 331, 361–62

[56] References Cited

U.S. PATENT DOCUMENTS

| | | | |
|---|---|---|---|
| 4,079,295 | 3/1978 | den Hollander | 315/411 |
| 4,180,852 | 12/1979 | Koizumi et al. | 363/49 |
| 4,980,811 | 12/1990 | Suzuji et al. | 363/21 |

Primary Examiner—Peter S. Wong
Assistant Examiner—Aditya Krishnan
Attorney, Agent, or Firm—Coudert Brothers

[57] ABSTRACT

A detection circuit for use in an electrical power converter having at least one negative output rail, for detecting the voltage of the negative output rail and for converting the voltage to a positive output voltage. The detection circuit includes an input port for receiving the negative output rail voltage from an electrical power converter, an output port, a ground reference potential, a node having a voltage that is positive with respect to the ground reference potential, and a circuit for generating a measurement current from the node to the ground reference potential. The value of this measurement current is a function of the negative output rail voltage received at the input port. A circuit is further provided for generating an output voltage at the output port that is positive with respect to said ground reference potential and whose value is a function of said measurement current. The detection circuit can be used with conventional pulse-width modulators of switch mode power supplies in order to regulate the value of the negative rail voltage.

13 Claims, 2 Drawing Sheets

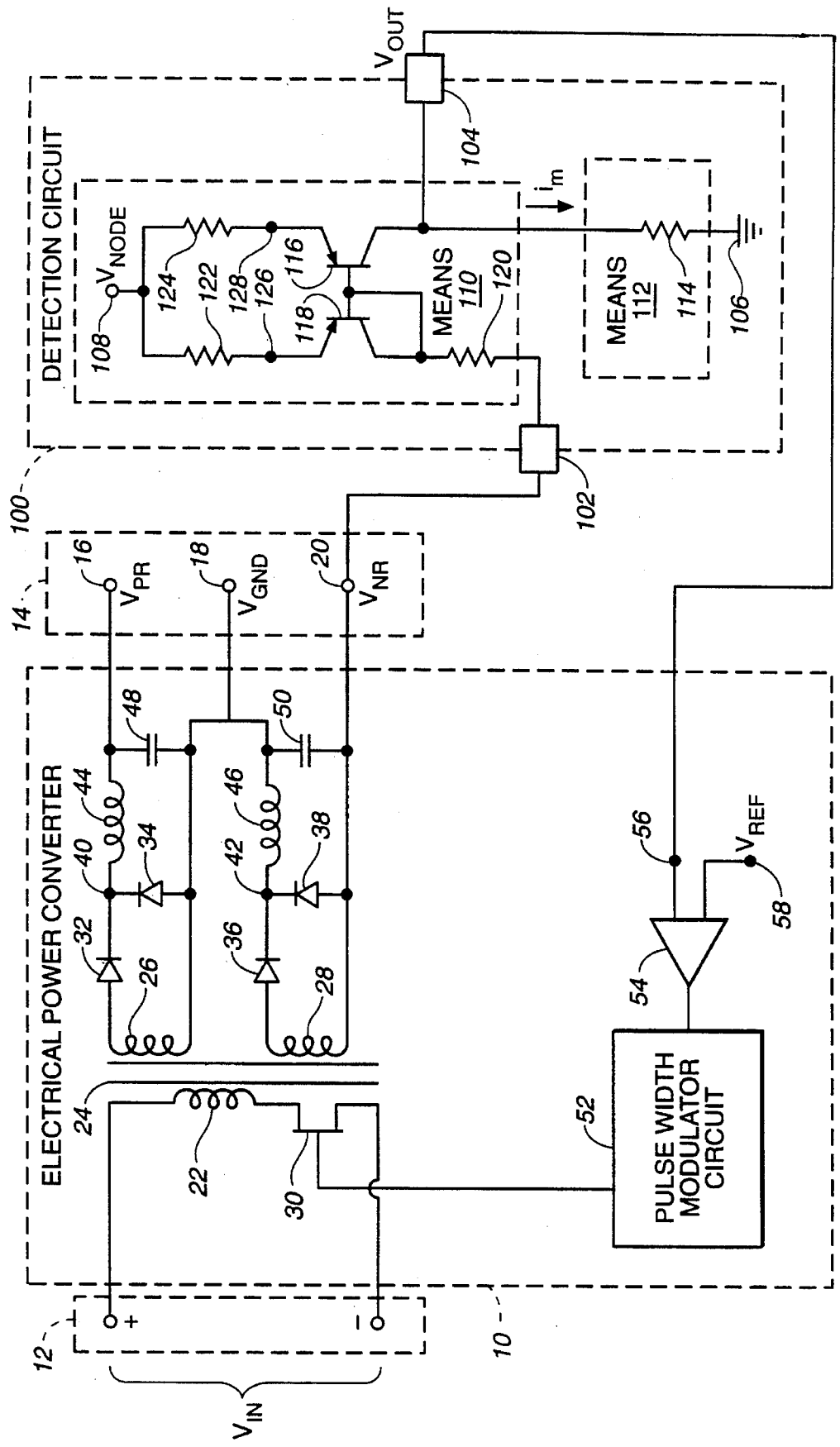
FIG._1

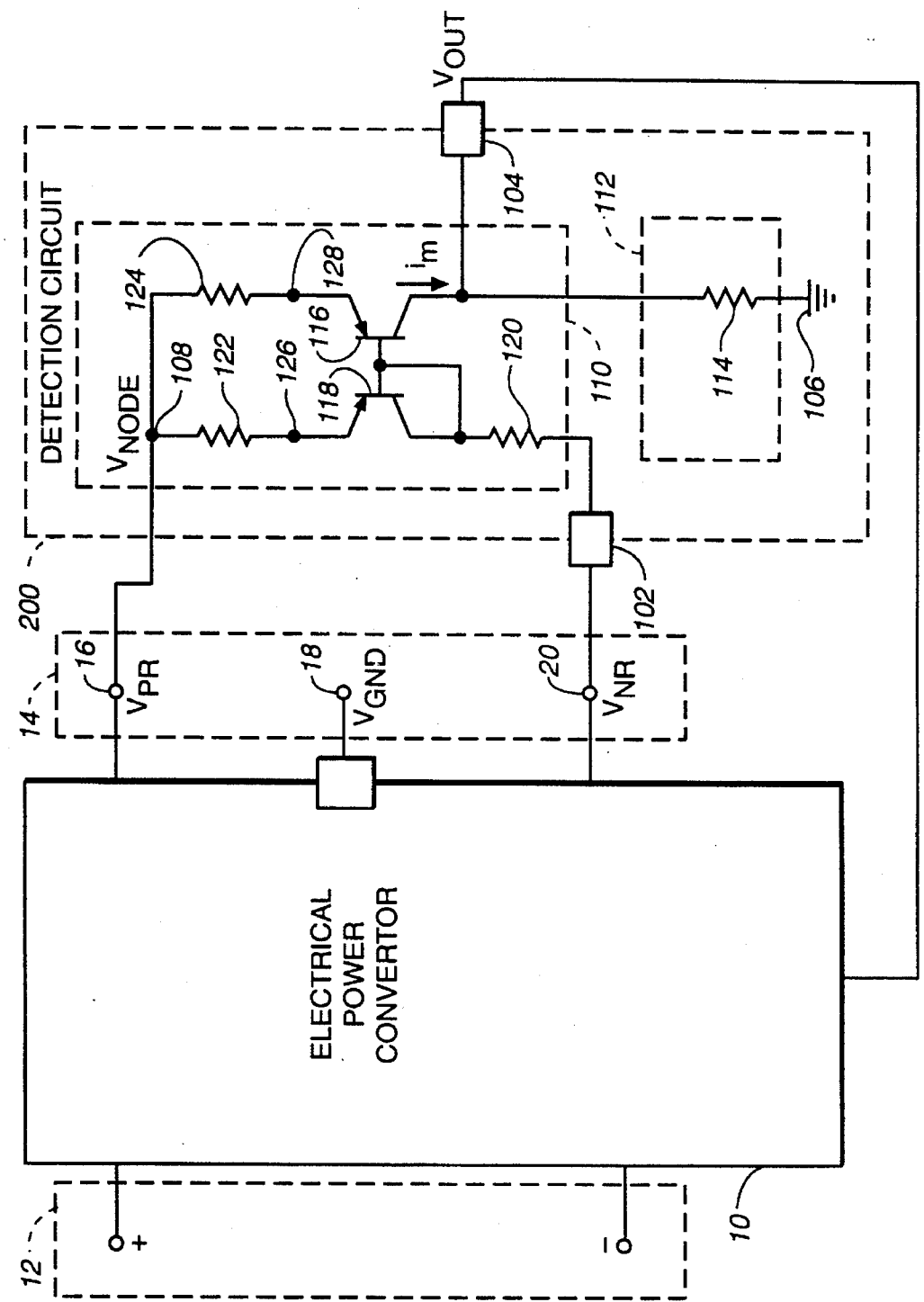
FIG._2

CIRCUIT FOR DETECTING NEGATIVE OUTPUT RAILS

FIELD OF THE INVENTION

The present invention relates to circuits for controlling the output voltage of an electrical power converter and more particularly to circuits for detecting the negative output voltage rail of electrical power converters having at least one negative output voltage.

BACKGROUND OF THE INVENTION

Electrical power converters are devices for processing electrical power from one form, such as a positive DC voltage, into another form, such as one or more DC output voltages. It is common for electrical power converters to provide output power at two or more output ports each having a different output voltage level, commonly referred to as a "voltage rail." Such multiple-output power converters often have at least one output voltage rail which is negative with respect to a ground reference voltage.

For many applications, it is important to regulate the output voltages of an electrical power converter to predetermined values. In such cases, the output voltages of the power converter are commonly controlled by a regulator circuit, such as a switching regulator in the case of switch mode power converters. A switching regulator commonly controls one or more switches that govern the coupling of voltage and current from the input of the converter to a power transformer within the power converter. The regulation process is commonly performed by a pulse-width modulator that is responsive to at least one output voltage of the power converter. By varying the duration of the voltage and current pulses coupled through the switches, the pulse-width modulator controls the output voltages of the converter.

Conventional pulse-width modulator circuits commonly are capable of directly detecting and regulating only positive output voltages. Negative output voltages are generally controlled by virtue of being functionally related to a, positive output voltage which is directly regulated. Alternatively, a negative output voltage may be inverted into a positive voltage, which is then detected and regulated by a pulse-width modulator such that the negative output voltage rail is regulated.

In circuits where the negative output rail is controlled by virtue of being functionally related to a regulated positive output rail, there are often problems with cross-regulation. For example, an increase in the load current on the positive output results in the pulse-width modulator increasing the pulse width to keep the voltage of the positive output rail constant. Increasing the pulse width, however, also increases the magnitude of the negative output rail voltage, which may result in a lower negative output voltage than desired.

Where the negative output voltage is converted to a positive output voltage in prior art systems, a conventional operational amplifier, or "op-amp", is commonly used so that the negative rail can be regulated by a conventional pulse-width modulator. The advantage of using an op-amp circuit for this purpose is its precision. Using op-amps for this purpose, however, has limitations. Op-amps are relatively costly. Additionally, op-amps typically require resistors to perform the desired detection function. The op-amp and associated resistors occupy a significant amount of area on a printed circuit board ("PCB").

As an alternative to regulating only one output voltage, the power converter may contain separate pulse width modulators and separate primary power transformer windings for producing each of the regulated output voltages. In such cases, the pulse width modulators are commonly positioned on the primary side of the power transformer. Each output voltage is then measured in a conventional manner using an opto-isolator to transmit a measurement signal to the corresponding pulse width modulator. The opto-isolator additionally serves to maintain isolation between the primary and secondary sides of the power converter. This approach has the following disadvantages. First, more than one pulse width modulator and primary power transformer winding are necessary to regulate multiple output voltages. Additionally, a separate output voltage detection circuit is required for each regulated output voltage, with the corresponding optoisolators and resistors for each circuit. Third, additional circuit elements increase costs and printed circuit board area requirements.

Accordingly, there is a need for a relatively efficient and inexpensive circuit for detecting one or more negative output voltage rails of an electrical power converter and providing a signal that can be used by conventional pulse-width modulators for regulating the negative output voltage. There is a further need for a relatively inexpensive output voltage detection circuit for use in regulating more than one output voltage such that cross-regulation problems are reduced.

SUMMARY OF THE INVENTION

The present invention is for use in an electrical power converter having at least one negative output rail. Broadly stated, the present invention is a detection circuit for detecting the voltage of the negative output rail and for converting it to a positive output voltage, comprising an input port for receiving the negative output rail voltage; an output port; a ground reference potential; a node having a voltage that is positive with respect to said ground reference potential; means for generating a measurement current from said node to said ground reference potential that is a function of the negative output rail voltage at said input port; means for generating an output voltage at said output port that is positive with respect to said ground reference potential and is a function of said measurement current.

An object of the present invention is, therefore, to provide a relatively inexpensive circuit for detecting a negative output rail of an electrical power converter and for generating a positive voltage as a function thereof.

Another object of the present invention is to provide a circuit for detecting the negative voltage of a negative output rail of an electrical power converter and for converting said negative voltage into a positive voltage that can be used with conventional pulse-width modulators of switch mode power supplies, such that the voltage on said negative rail can be regulated.

Yet another object of the present invention is to provide an apparatus for detecting a negative output rail of an electrical power converter that allows for efficient use of printed circuit board area.

Still another object of the present invention is to provide an apparatus for detecting the voltage between two output rails of a multiple output electrical power converter in a manner which reduces adverse effects of cross-regulation.

A further object of the present invention is to provide a circuit for regulating more than one output of a power converter that is inexpensive and can be used with a single pulse width modulator circuit.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a combined block and circuit diagram of a first embodiment of a circuit for detecting a negative output rail according to the present invention.

FIG. 2 is a combined block and circuit diagram of a second embodiment of the present invention.

DETAILED DESCRIPTION OF THE INVENTION AND PREFERRED EMBODIMENTS

A combined block and circuit diagram of a detection circuit for detecting a negative output rail according to the present invention is shown at 100 in FIG. 1. Detection circuit 100 is used to detect the voltage of the negative output rail of an electrical power converter having a least one negative output rail and for converting this negative voltage to a positive output voltage $V_{OUT}$.

An exemplary electrical power converter 10 is shown in FIG. 1. Electrical power converter 10 may comprise any conventional electrical power converter where it is desired that the converter be responsive to the value of a negative output voltage. In FIG. 1, for illustrative purposes, electrical power converter 10 is shown as a conventional DC—DC switch mode power converter having an input port 12 for receiving a DC input voltage $V_{IN}$ and an output port 14 for providing one or more output voltages. Input port 12 has a positive terminal and a negative terminal indicated by the symbols "+" and "−", respectively.

Output port 14 comprises output terminals 16, 18, and 20. Three output terminals are shown for illustrative purposes only. It will be appreciated by those skilled in the art that the present invention may be used with power converters having any number of output terminals. Output terminal 16 provides a positive output rail having a positive output rail voltage $V_{PR}$. In a preferred embodiment, positive output rail voltage $V_{PR}$ is equal to 12 volts. Output terminal 18 provides an output reference voltage $V_o$ which, in a preferred embodiment, is ground. Output terminal 20 provides a negative output rail having a negative output rail voltage $V_{NR}$. In a preferred embodiment, negative output rail voltage $V_{NR}$ is equal to −12 volts.

Electrical power converter 10 also comprises a conventional power transformer having a primary winding 22 magnetically coupled on a core 24 to secondary windings 26 and 28. The DC input voltage $V_{IN}$ is selectively coupled across primary winding 22 by a switch 30. Primary winding 22 and switch 30 are coupled in series between the positive and negative terminals of input port 12.

Electrical power converter 10 also may conventionally comprise diodes 32, 34, 36, and 38, nodes 40 and 42, inductors 44 and 46, and capacitors 48 and 50. One end of secondary winding 26 is coupled to output terminal 18. Diode 32 is coupled between the other end of secondary winding 26 and node 40 such that electrical current may be conducted through diode 32 only in the direction toward node 40. Diode 34 is coupled between output terminal 18 and node 40 such that electrical current may be conducted through diode 34 only in the direction toward node 40. Inductor 44 is coupled between node 40 and output terminal 16. Capacitor 48 is coupled between output terminal 18 and output terminal 16. One end of secondary winding 28 is coupled to output terminal 20. A diode 36 is coupled between the other end of secondary winding 28 and node 42 such that electrical current may be conducted through diode 36 only in the direction from secondary winding 28 to node 42. Diode 38 is coupled between output terminal 20 and node 42 such that electrical current may be conducted through diode 38 only in the direction toward node 42. Inductor 46 is coupled between node 42 and output terminal 18. Capacitor 50 is coupled between terminal 18 and output terminal 20.

Electrical power converter 10 also comprises a conventional pulse width modulator circuit 52 and an error amplifier 54. Error amplifier 54 compares a signal received at an input terminal 56 with a reference voltage $V_{REF}$ at input terminal 58 and generates an error signal. In response to the error signal generated by error amplifier 54, pulse width modulator circuit 52 controls switch 30 such that the DC input voltage $V_{IN}$ is selectively coupled across primary winding 22 in a series of voltage pulses. The voltage pulses generated across primary winding 22 induce voltage pulses across secondary windings 26 and 28. It will be recognized by those skilled in the art that diodes 32 through 38, nodes 40 and 42, inductors 44 and 46, and capacitors 48 and 50 comprise conventional rectifier and filter circuits that rectify and filter the voltage pulses of secondary windings 26 and 28 to provide the output voltage rails at output port 14. In the embodiment shown, a positive DC output rail voltage is provided at output terminal 16 and a negative DC output rail voltage is provided at output terminal 20. It will be recognized by those skilled in the art that electrical power converter 10 is a conventional switch mode power converter and that any other conventional switch mode power converter having a negative rail may be used with detection circuit 100 in place of the electrical power converter shown in FIG. 1.

Detection circuit 100 according to the present invention comprises an input port 102 for receiving the negative output rail voltage $V_{NR}$ and a detection circuit output port 104 for providing a detection circuit positive output voltage $V_{OUT}$. Detection circuit 100 also comprises a ground reference potential 106 and a node 108 having a voltage $V_{NODE}$ that is positive with respect to said ground reference potential. Detection circuit 100 also comprises a means 110 for generating a measurement current $i_M$ from node 108 to ground reference potential 106 that is a function of the negative output rail voltage $V_{NR}$ at port 102. Detection circuit 100 also comprises means 112 for generating a voltage $V_{OUT}$ at output port 104 as a function of measurement current $i_M$ such that output voltage $V_{OUT}$ is positive with respect to ground reference potential 106.

A detailed embodiment of detection circuit 100 is also shown in FIG. 1. In the embodiment shown in FIG. 1, means 112 for generating output voltage $V_{OUT}$ comprises a resistor 114 coupled between output port 104 and ground reference potential 106. Means 110 for generating measurement current $i_M$ comprises a first transistor 116, a second transistor 118, resistors 120, 122, and 124, and nodes 126 and 128 coupled as shown in FIG. 1. First transistor 116 has a first conduction terminal coupled to node 128, a second conduction terminal coupled to output port 104, and a control terminal. Second transistor 118 has a first conduction terminal coupled to node 126, a control terminal coupled to the control terminal of first transistor 116, and an output terminal coupled to the base terminal of second transistor 118. Detection circuit 100 also comprises a resistor 120 coupled between the second conduction terminal of second transistor 118 and input port 102. In a preferred embodiment, detection circuit 100 also comprises resistors 122 and 124 coupled between the nodes 126 and 128, respectively, and node 108 as shown in FIG. 1. It will be recognized by those skilled in the art that transistors 116 and 118 are coupled together as a current mirror. It will also be recognized that resistors 122 and 124 are needed only to provide appropriate biasing for transistors 116 and 118 when necessary and that either node 126 or node 128, or both, may be coupled directly to node 108.

Although transistors 116 and 118 are shown as being bipolar junction ("BJT") transistors having base terminals used as the control terminals described above, it will be appreciated by those skilled in the art that other types of transistors, such as conventional MOSFET transistors having gates as control terminals, may be used as transistors 116 and 118 in detection circuit 100. It will further be appreciated that, with the control and second conduction terminal of transistor 118 being coupled to one another, transistor 118 is functioning substantially as a diode and that, in many embodiments of the present invention, transistor 118 may be replaced by a diode. In a preferred embodiment, transistors 116 and 118 are substantially identical and resistors 122 and 124 have the same resistance. As shown in FIG. 1, transistors 116 and 118 may comprise conventional pnp BJT transistors each having an emitter as the first conduction terminal, a collector as the second conduction terminal, and a base as the control terminal. The operation of the circuit will be described in terms of the illustrated embodiment neglecting leakage currents, assuming transistors 116 and 118 are identical, and assuming that the output resistance of transistor 116 is infinite.

Resistor 122, transistor 118, and resistor 120 are coupled in series between node 108 and input 102. Because transistor 118 is diode-connected, it is clear that the base-emitter voltage $V_{BE}$ of transistor 118 equals the potential difference between node 108 and input 102 (i.e. $V_{NODE-VNR}$) minus the voltage drops across resistors 120 and 122. Thus, since $V_{NODE}$ and the resistance of resistors 120 and 122 are constant, $V_{BE}$ is a function of $V_{NR}$.

Being coupled together, the base voltages of transistors 116 and 118 are equal. The emitters of the transistors are coupled through resistors to the same node 108. Thus, the base-emitter voltages of the transistors are functionally related and their relationship depends on the characteristics of the transistors and resistors 122–124. In a preferred embodiment (i.e., where resistors 122 and 124 are identical and transistors 116 and 118 are identical), the base-emitter voltages are equal.

Assuming transistors 116 and 118 are identical and therefore have the same base-emitter voltages, their collector currents are equal (otherwise, the collector currents are functionally related). The measurement current $i_M$, shown in FIG. 1 is the collector current of transistor 116, and is therefore equal to the collector current of transistor 118. Thus, $i_M$ is a function of the base-emitter voltage of transistor 118, which is further a function of the negative output rail voltage $V_{NR}$ as described above. In summation, the measurement $i_M$ is a function of $V_{NR}$.

In accordance with Ohms Law, the measurement current $i_M$ conducted through resistor 114 causes output voltage $V_{OUT}$ to be proportional to measurement current $i_M$. This voltage is positive with respect to ground reference potential 106. Thus, output voltage $V_{OUT}$ is a positive voltage that is a function of the value of the negative output rail voltage $V_{NR}$.

Output voltage $V_{OUT}$ is then coupled to input 56 of error amplifier 54, which error amplifier compares the value of $V_{OUT}$ to the reference voltage $V_{REF}$ received by pulse width modulator circuit 52 as described above. Regulating of the negative voltage of negative rail 20 is therefore accomplished in a simple and easy way.

In a preferred embodiment, reference voltage $V_{REF}$ is approximately 2.5 volts. In a preferred embodiment, $V_{NODE}$ is approximately 5 volts, $V_{NR}$ is regulated to approximately −12 volts, resistors 122 and 124 have values of approximately 1 kohm, resistor 120 has a value of approximately 16 kohm, and resistor 114 has a value of approximately 2 kohm.

The pair of transistors used in detection circuit 100 is available in a SOT143 surface mount package, which occupies the same PCB area as a single transistor in a SOT23 package.

A disadvantage of using this circuit is that the temperature of the mirror transistor's base-emitter voltage $V_{BE}$ affects the output voltage temperature coefficient. This is because the mirror current is proportional to $V_{NR}+V_{NODE}-V_{BE}$. A 50 degree Centigrade (°C) change in temperature will result in a change in output voltage of 50° C×2 mV/°C=100 mV. This is less than 1% for a −12 V output and is normally acceptable.

A second embodiment of the present invention is shown as detection circuit 200 in FIG. 2. Detection circuit 200 comprises all of the same elements as detection circuit 100, and the numbering of such elements in FIG. 2 is identical to their numbering in FIG. 1. Detection circuit 200 is also shown coupled to a block diagram of electrical power converter 10, which was discussed in connection with FIG. 1.

In detection circuit 200, node 108 is coupled to the positive output rail provided by electrical power converter 10 at output terminal 16 such that the voltage $V_{NODE}$ at node 108 is equal to the positive output rail voltage $V_{PR}$. The input terminal 102 of detection circuit 200 is coupled to output terminal 20 of electrical power converter 10 for receiving the negative output rail voltage $V_{NR}$. In a preferred embodiment, the positive output rail voltage $V_{PR}$ is equal to +12 volts and negative output voltage $V_{NR}$ is equal to −12 volts. Thus, the pulse width modulator circuit 52 of electrical power converter 10 (which was shown in FIG. 1) is enabled to regulate the total voltage between output terminal 16 and output terminal 20, approximately 24 volts.

By sensing and regulating the total 24 volts, problems of cross-regulation are reduced. For example, if only the positive output rail were regulated, as described above, an increase in load current on the positive output rail would result in the pulse width modulator circuit increasing the pulse width to hold the positive output rail constant, with the consequence that the negative output rail voltage would be lower than desired. More specifically, the negative output rail voltage may change 5% due to load variation on the −12 V output plus 5% due to load variation on the +12 V output, totaling 10%. With the voltage difference between $V_{PR}$ and $V_{NR}$ regulated, an increase in load current on the positive output rail will still result in an increased pulse width. However, $V_{PR}$ will be raised and $V_{NR}$ will be lowered only until their difference is 24 volts. Thus, the effects of the load variation will be shared equally between $V_{PR}$ and $V_{NR}$. For example, the 10% change due to load variation described above will be shared so that each output has a 5% change.

The cost of an op-amp circuit is not justified in such circumstances. The temperature effects described above cause the output voltage of the current mirror to change by about 0.4% maximum (i.e., about 10 times smaller than the changes due to load variation).

While the present invention has been particularly described with respect to the illustrated embodiments, it will be appreciated that various alterations, modifications, and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, to the contrary, is intended to cover various modifications and equivalent arrangements included within the scope of the appended claims.

What is claimed is:

1. In an electrical power converter having at least one negative output rail, a detection circuit for detecting the voltage of the negative output rail and for converting said voltage to a positive output voltage comprising:

an input port for receiving the negative output rail voltage;

an output port;

a ground reference potential;

a node having a voltage that is positive with respect to said ground reference potential;

means for generating a measurement current from said node to said ground reference potential, said measurement current having a value that is a function of the negative output rail voltage received at said input port; and means for generating an output voltage at said output port that is positive with respect to said ground reference potential, said output voltage having a value that is a function of said measurement current.

2. The detection circuit of claim 1, wherein the electrical power converter is a switch mode power converter having one or more output voltage rails, the voltage of said voltage rails of said power converter being controlled by a pulse width modulator; and wherein said pulse width modulator is responsive to the output voltage at said output port of said detection circuit.

3. The detection circuit of claim 1, wherein said means for generating an output voltage at said output port comprises a resistor coupled between said output port and said ground reference potential.

4. The detection circuit of claim 3, wherein:

said means for generating a measurement current comprises a first transistor having a first conduction terminal coupled to said node, a second conduction terminal coupled to said output port, and a control terminal;

a second transistor having a first conduction terminal coupled to said node, a second conduction terminal coupled to said input port, and a control terminal coupled to the control terminal of said first transistor, and wherein the base terminal of said second transistor is coupled to the second conduction terminal of said second transistor; and a resistor coupled between the second conduction terminal of said second transistor and said input port.

5. The detection circuit of claim 4 wherein a resistor is coupled between said node and the first conduction terminal of said second transistor.

6. The detection circuit of claim 4 wherein a resistor is coupled between said node and the first conduction terminal of said first transistor.

7. The detection circuit of claim 1 wherein said electrical power converter has at least one positive output rail, and said node is coupled to said positive output rail.

8. The detection circuit of claim 4 wherein said first transistor is a bipolar junction transistor.

9. The detection circuit of claim 4 wherein said second transistor is a bipolar junction transistor.

10. The detection circuit of claim 1 wherein the voltage of said negative output rail is approximately negative twelve volts with respect to said ground reference potential.

11. The detection circuit of claim 7 wherein the voltage of said positive output rail is approximately positive twelve volts with respect to said ground reference potential.

12. The detection circuit of claim 1 wherein the voltage of said node is approximately five volts with respect to said ground reference potential.

13. In an electrical power converter having at least one negative output rail, a detection circuit for detecting the voltage of the negative output rail and for converting said voltage to a positive output voltage comprising:

an input port for receiving the negative output rail voltage;

an output port;

a ground reference potential;

a node having a voltage that is positive with respect to said ground reference potential;

a first transistor having a first conduction terminal coupled to said node, a second conduction terminal coupled to said output port, and a control terminal;

a second transistor having a first conduction terminal coupled to said node, a second conduction terminal coupled to said input port, and a control terminal coupled to the control terminal of said first transistor, and wherein the base terminal of said second transistor is coupled to the second conduction terminal of said second transistor;

an output resistor coupled between said output port and said ground reference potential, said positive output voltage being generated across said output resistor; and an input resistor coupled between said second conduction terminal of said second transistor and said input port.

* * * * *